Patented Oct. 20, 1936

2,057,978

UNITED STATES PATENT OFFICE

2,057,978

HETEROCYCLIC COMPOUNDS

Joachim Reitmann, Wuppertal/Elberfeld, Germany, assignor to Winthrop Chemical Company Inc., New York, N. Y., a corporation of New York No Drawing. Application June 25, 1931, Serial No. 546,909. In Germany June 27, 1930

31 Claims. (Cl. 260—32)

The present invention relates to new heterocyclic compounds containing nitrogen, more particularly it relates to compounds wherein a heterocyclic 5-ring containing nitrogen is condensed with an at least partially hydrogenated carbocyclic ring system and with the heterocyclic nucleus of a heterocyclic ring system containing nitrogen in heterocyclic linkage; the invention further relates to the process of preparing the said heterocyclic compounds.

In accordance with the present invention heterocyclic compounds containing a 5-membered ring of the formula

wherein the carbon atoms in the 2- and 3-position are simultaneously members of an at least partially hydrogenated carbon ring system and the ring members in the 1- and 5-position are simultaneously members of the heterocyclic nucleus of a heterocyclic ring system containing nitrogen, are obtainable by a reaction which substantially consists in reacting upon a heterocyclic compound containing nitrogen in the heterocyclic nucleus and in the ortho-position to the said nitrogen atom an amino group, with an at least partially hydrogenated carbocyclic compound containing two reactive and replaceable substituents in the ortho-position, while heating. Instead of the above mentioned heterocyclic compounds containing nitrogen in the heterocyclic nucleus which is substituted by an amino group their equivalents, that is the corresponding tautomeric imino compounds, may be used.

As carbocyclic compounds of the kind specified above come into consideration, among others, the corresponding substitution products of cyclohexane and cyclopentane, as well as the substitution products of other partially or completely hydrogenated cyclic systems, for example, those of tetrahydro- and decahydronaphthalene. Particularly suitable reactive substituents have proved to be, for example, halogen atoms, free or etherified hydroxyl groups and carbonyl oxygen atoms. As the heterocyclic compounds containing nitrogen and a hydrogen atom in the nitrogen containing ring in the ortho-position to an amino group, for example, the corresponding amino-pyridines and Py-amino-quinolines can be used, but also other heterocyclic amino compounds, for example, the amino compounds of isoquinoline, pyrimidine, imidazole and triazole have proved useful in my present process.

In addition to the groups indicated the components may contain still further monovalent substituents, such as, for example, the alkyl, aryl and aralkyl group, hydroxy- and alkoxy-, nitro- and amino- groups and halogen atoms.

From the above it results that by varying the starting components of the reaction a great number of new heterocyclic compounds is obtainable. Numerous examples illustrate my present invention, however, these examples only describe the production of some typical representatives of the new compounds, since the scope of the present invention becomes obvious for those skilled in the art from the particulars of the disclosure, so that a still more particular description of the single products seems unnecessary.

The reaction proceeds when, for example, ortho-halogen cyclohexanone and alpha-aminopyridine are used as the starting materials with the formation of a tetrahydrogenated heterocyclic base in accordance with the following outline of the reaction:

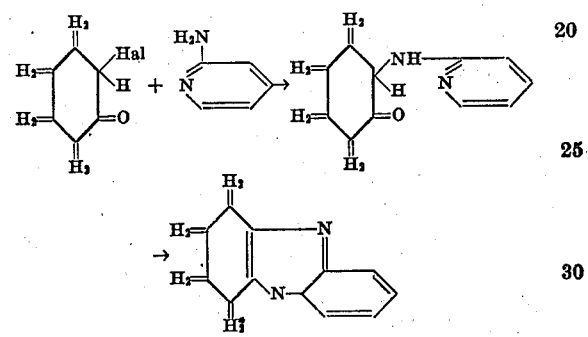

A hexahydrogenated base is obtained when a halogen cyclohexane containing in the ortho-position to the halogen atom a monovalent replaceable substituent, such as halogen, is caused to act on an aminopyridine in accordance with the following equation:

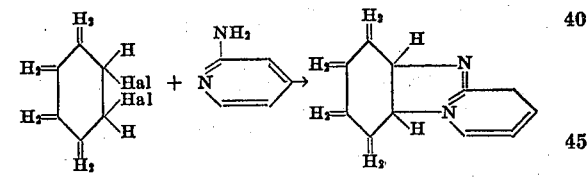

The manufacture of the new compounds can be carried out by first producing the intermediate product indicated in the Equation 1 and splitting off water from the same by means of dehydrating agents, such as, for example, acetic anhydride, sulfuric acid or phosphorus pentoxide. The condensation can also be carried out in a single step by causing the components to condense, for example, by heating as such or in a solvent or diluent, if necessary with the addition of a catalyst or condensing agent. If desired or required the compounds thus obtainable can be hydrogenated by the customary methods, for example, by means of sodium and alcohol or stannous chloride and hydrochloric acid or also catalytically.

The compounds obtainable in accordance with the present invention display a basic character and are insoluble in water, soluble in organic solvents. They form with acids salts which, in general, are soluble in water. The new products are intended to find technical application, for example, as intermediates in the manufacture of dyestuffs and pharmaceutic media, and display partially a therapeutic activity.

The invention is illustrated by the following examples without being restricted thereto:

Example 1

39 grams of sodamide are covered with 300 ccs. of toluene and heated to 90° C. A solution of 94 grams of alpha-aminopyridine in 200 ccs. of toluene is then dropped in. When after about one hour the evolution of ammonia has ceased, 135 grams of ortho-chloro-cyclohexanone are added gradually, the greater part of the toluene is distilled off, ice water is added to the residue, the whole is rendered weakly acid to Congo red, extracted with ether and the ether is removed.

The remaining acid aqueous solution is then rendered strongly alkaline with potassium carbonate and shaken with ether to which a little alcohol has been added. The ethereal solution, decolorized by means of animal charcoal, is then concentrated and strongly cooled, whereupon the 2-(alpha-pyridyl-amino)-cyclohexanone-1 of the formula:

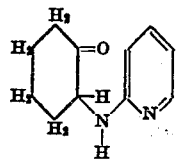

separates in the form of white crystals, melting at 147° C. The solution contains still further quantities of this compound in admixture with alpha-aminopyridine and a certain amount of a condensation product of the following formula:

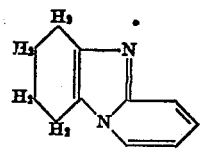

produced from the former compound. This condensation product is obtained from the 2-(alpha-pyridylamino)-cyclohexanone-1 in the following manner:

7 grams of 2-(alpha-pyridylamino)-cyclohexanone-1 are heated to boiling for 4 hours with 12 grams of acetic anhydride. The reaction mixture is then poured into water and rendered alkaline with potassium carbonate solution. The product, which separates as an oil but soon solidifies, is filtered with suction and crystallized from ether. In this manner white crystals are obtained, which melt at 95° C. They are readily soluble in acids and organic solvents with the exception of ether. When bichromates are added in acetic acid solution, beautifully crystallizing double salts result.

Example 2

A solution of 94 grams of alpha-aminopyridine in 500 ccs. of absolute alcohol is boiled for 10 hours under a reflux condenser with 135 grams of ortho-chloro-cyclohexanone. The alcohol is then distilled off, the residue is acidified with acetic acid and extracted with ether, a saturated solution of sodium bichromate is added to the acetic acid aqueous solution and the precipitated chromate is filtered with suction. The chromate is decomposed by means of caustic soda lye and the oil which separates is extracted with ether to which alcohol has been added. After drying the solvent is distilled off and the residue is fractionated. The reaction product distils at 150° C. under 2 mms. pressure as a light yellow oil, which gradually solidifies. On crystallizing from ether it forms white crystals, melting at 95° C., which are identical with the tricyclic condensation product described in Example 1. The iodomethylate melts at 257° C.

Example 3

A solution of 54 grams of alpha-aminopicoline in 300 ccs. of alcohol is boiled for 10 hours under a reflux condenser with 68 grams of ortho-chloro-cyclohexanone. The working up follows as in Example 2. The reaction product of the formula:

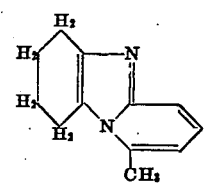

distils under 2 mms. pressure at 156–160° C. as a light yellow oil, which gradually solidifies. On crystallizing from ether it forms white crystals, melting at 56° C. The iodomethylate melts at 302° C.

Example 4

24 grams of alpha-aminopyridine are heated to 100° C. for 10 hours with 37 grams of 4-methyl-2-chloro-cyclohexanone-1 (boiling under 3 mms. pressure at 65–70° C. and obtainable by the chlorination of 4-methyl-cyclohexanol). The reaction mixture is then dissolved in water with the addition of acetic acid and worked up as in Example 2. The reaction product of the formula:

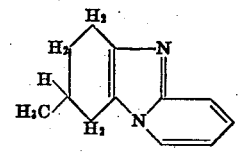

distils under 3 mms. pressure at 150–154° C. as a light yellow oil, which soon solidifies. On crystallizing from ether it forms white crystals, melting at 94° C. The iodomethylate melts at 270° C.

Example 5

A solution of 20 grams of alpha-aminopyridine in 200 ccs. of alcohol is boiled for 10 hours under a reflux condenser with 46 grams of 4-benzyl-2-chloro-cyclohexanone (boiling under 1 mm. pressure at 150–155° C. and obtainable by the chlorination of 4-benzyl-cyclohexanol). The residue remaining after distilling off the alcohol is dissolved in water with the addition of acetic acid, the mixture is extracted with ether, the aqueous solution is then rendered alkaline with potassium carbonate and extracted with ether to which alcohol has been added. After distilling off the solvent the reaction product of the formula:

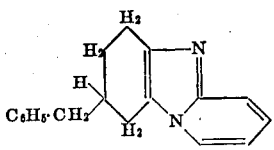

distils under 1 mm. pressure at 204–212° C. as a light red oil.

*Example 6*

A solution of 20 grams of alpha-aminopyridine in 50 ccs. of alcohol is boiled for 10 hours under a reflux condenser with 38 grams of 3-methyl-5-isopropyl-2-chlorocyclohexanone (boiling under 3 mms. pressure at 95–100° C. and obtainable by the chlorination of 3-methyl-5-isopropyl-cyclohexanol). The working up follows as in Example 5. The reaction product of the formula:

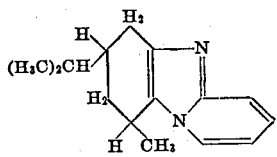

boils as a light colored viscous oil at 155–160° C. under 1 mm. pressure.

*Example 7*

A solution of 47 grams of alpha-aminopyridine in 250 ccs. of alcohol is boiled for 10 hours under a reflux condenser with 121 grams of ortho-dibromo-cyclohexane. The working up follows as in Example 5. The reaction product of the formula:

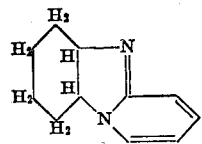

boils under 3 mms. pressure at 122–125° C. as a light yellow oil, which gradually solidifies. On crystallizing from ether, crystals melting at 94° C. are obtained.

The same compound is likewise obtained when 19 grams of alpha-aminopyridine are heated to 180° C. for 8 hours with 27 grams of ortho-methoxy-cyclohexanol and the reaction product is worked up as in Example 5.

*Example 8*

To a solution of 17.4 grams of the tricyclic condensation product of the melting point 95° C. obtainable in accordance with Examples 1 and 2 in 500 ccs. of absolute alcohol 20 grams of sodium are added bit by bit at the boil. The greater part of the alcohol is then distilled off, water is added to the residue and the mixture is extracted with ether. After distilling off the ethereal solution the reduced base of the formula:

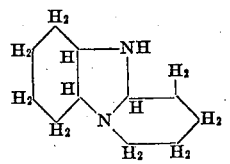

boils under 4 mms. pressure at 160–163° C. as a light colored oil, which soon solidifies. On crystallizing from ether it forms white crystals, melting at 58–59° C. The iodomethylate melts at 248° C.

*Example 9*

4.5 grams of 2-chloro-6-methoxycyclohexanone (boiling under 2 mms. pressure at 110–120° C. and obtainable by the chlorination of 2-methoxy-cyclohexanol) are boiled for 10 hours under a reflux condenser with 3 grams of alpha-aminopyridine and 20 ccs. of alcohol. The working up follows as in Example 5. The reaction product of the formula:

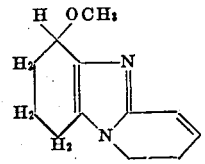

boils under 3 mms. pressure at 140° C. as a light colored oil.

*Example 10*

35 grams of 2-amino-5-nitro-pyridine are melted for 10 hours at 120° C. with 34 grams of 2-chloro-cyclohexanone. The reaction mixture is dissolved in dilute hydrochloric acid, the solution is decolorized by means of animal charcoal, sodium acetate solution is added to the filtrate, the precipitate produced is filtered with suction and crystallized from acetone. The reaction product of the formula:

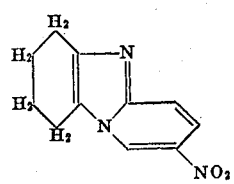

forms light yellow crystals, melting at 210° C.

The corresponding amino compound obtainable from this product by reduction in the customary manner forms white crystals, melting at 195° C. They are soluble in organic solvents, insoluble in water and form with acids, salts which dissolve in water.

*Example 11*

5 grams of 2-amino-5-iodopyridine are boiled for 10 hours under a reflux condenser with 20 ccs. of alcohol and 4 grams of 2-chloro-cyclohexanone. The working up follows as in Example 5. The reaction product of the formula:

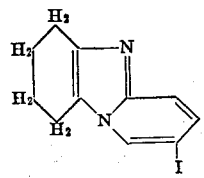

boils under 3 mms. pressure at 187–190° C. as a light colored oil, which soon solidifies. On crystallizing a product melting at 150° C. is obtained.

*Example 12*

18 grams of alpha-aminopyridine are boiled for 10 hours with 16 grams of ortho-bromo-cyclopentanone (boiling under 13 mms. pressure at 84–87° C. and obtainable by the bromination of cyclopentanone in glacial acetic acid) and 20 ccs. of alcohol. The working up of the reaction mixture is carried out as in Example 5. The reaction product of the formula:

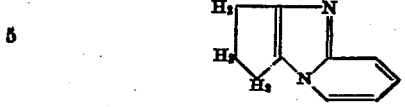

distils under 2.5 mms. pressure at 145° C. as a light colored oil, which gradually solidifies.

*Example 13*

26 grams of alpha-aminopyridine are boiled for 10 hours with 45 grams of 1-keto-2-bromo-1.2.3.4-tetrahydro naphthalene and 100 ccs. of alcohol. The working up of the reaction mixture is carried out as in Example 5. The reaction product of the formula:

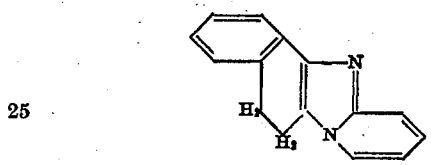

boils under 1 mm. pressure at 200–210° C. and solidifies immediately. After crystallizing from a little alcohol it melts at 157° C. The sulfate is sparingly soluble in water. From the acid solution of the base bichromates precipitate a nearly insoluble yellow chromate.

In an analogous manner, for example, 1-keto-2-bromo-decahydro naphthalene may be condensed, for example, with alpha-aminopyridine.

*Example 14*

5 grams of 2-amino-6-methoxy-quinoline are boiled with 5 grams of ortho-chloro-cyclohexanone in 50 ccs. of alcohol for 12 hours. Thereupon the alcohol is distilled off and the residue treated with dilute hydrochloric acid, whereby the difficultly soluble hydrochloride of the base of the formula:

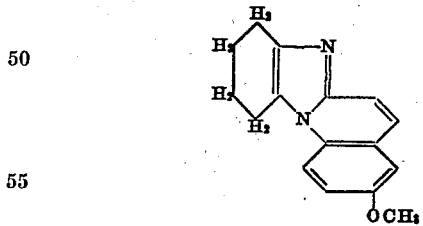

separates off in white crystals. After recrystallizing from water the crystals melt at 265° C.

In order to obtain the free base, a hot aqueous solution of the hydrochloride is mixed with an aqueous solution of potassium carbonate, whereby the base separates as a colorless quickly solidifying oil. The mass is filtered with suction, dried, dissolved in a small quantity of alcohol, filtered and precipitated by means of ether. The new compound has the melting point of about 153° C. It is readily soluble in acetic acid, its hydrochloride and sulfate are difficultly soluble in water.

*Example 15*

7.2 grams of 1-amino-isoquinoline are boiled with 7 grams of ortho-chloro-cyclohexanone in 50 ccs. of alcohol for 12 hours. The reaction mixture is worked up as described in Example 5. The reaction product of the formula:

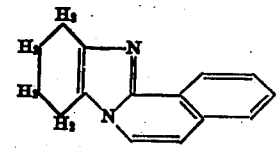

boils under 3 mms. pressure at a temperature of 200–210° C. as a light oil solidifying on cooling.

*Example 16*

3 grams of 2-amino-5.6-dimethyl-pyrimidine are boiled with 5 grams of chloro-cyclohexanone and 20 ccs. of alcohol for 12 hours. The reaction mixture is worked up as described in Example 5. The reaction product of the formula:

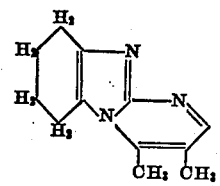

boils under 2 mms. pressure at a temperature of 190–200° C. as a light oil which soon solidifies. After recrystallizing from acetone white crystals of the melting point 186° C. are obtained.

*Example 17*

1 gram of 2-amino-4-methyl-triazole (compare Ber. d. deutschen Chem. Ges. 26 (1893), page 2599) is boiled with 2 grams of chlorocyclohexanone and 10 ccs. of alcohol for 12 hours. The reaction mixture is worked up as described in Example 5. The reaction product of the probable formula:

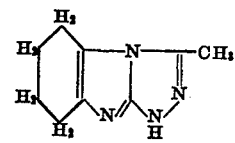

boils under 2 mms. pressure at a temperature of 180° C. as a light oil solidifying on cooling. After recrystallization from acetone crystals of the melting point 229° C. are obtained.

I claim:—

1. The compounds which essentially are characterized by a five-membered ring of the formula:

wherein the carbon atoms in the 2- and 3-position are simultaneously members of an at least partially hydrogenated carbocyclic nucleus containing 5 to 6 carbon atoms, the 6-membered nucleus may stand in a naphthalene ring system, and the ring members in the 1- and 5-position are simultaneously members of a heterocyclic compound containing only nitrogen as the hetero member in a 5- to 6-membered nucleus, the 6-membered nucleus may stand in a quinoline ring system, which compounds display a basic character and are insoluble in water, soluble in organic solvents and form with acids salts which, in general, are soluble in water.

2. The compounds which essentially are characterized by a five-membered-ring of the formula:

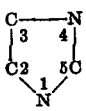

wherein the carbon atoms in the 2- and 3-position are simultaneously members of an at least partially hydrogenated six-membered carbon ring and the ring members in the 1- and 5-position are simultaneously members of a heterocyclic compound containing only nitrogen as the hetero member in a 5- to 6-membered nucleus, the 6-membered nucleus may stand in a quinoline ring system, which compounds display a basic character and are insoluble in water, soluble in organic solvents, and form with acids salts which, in general, are soluble in water.

3. The compounds which essentially are characterized by a five-membered ring of the formula:

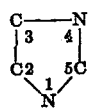

wherein the carbon atoms in the 2- and 3-position are simultaneously members of an at least partially hydrogenated carbocyclic nucleus containing 5 to 6 carbon atoms, the 6-membered nucleus may stand in a naphthalene ring system, and the ring members in the 1- and 5-position are simultaneously members of a heterocyclic six-membered ring containing as hetero member only nitrogen, which compounds display a basic character and are insoluble in water, soluble in organic solvents, and form with acids salts which, in general, are soluble in water.

4. The compounds which essentially are characterized by a five-membered ring of the formula:

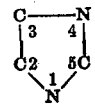

wherein the carbon atoms in the 2- and 3-position are simultaneously members of an at least partially hydrogenated six-membered carbon ring and the ring members in the 1- and 5-position are simultaneously members of a heterocyclic six-membered ring containing as hetero member only nitrogen, which compounds display a basic character and are insoluble in water, soluble in organic solvents and form with acids salts which, in general, are soluble in water.

5. The compounds which essentially are characterized by the ring system

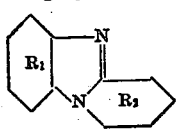

wherein the nucleus $R_1$ is at least partially hydrogenated and wherein the nucleus $R_2$ may be hydrogenated, which compounds are basic products insoluble in water, soluble in organic solvents, and form with acids salts which, in general, are soluble in water, and are obtainable by condensation of a 6-membered nucleus containing at least one nitrogen atom as a hetero-member and an amino group in ortho-position to such nitrogen atom with a 6-membered at least partially hydrogenated carbocyclic nucleus containing two reactive and replaceable substituents in ortho-position.

6. The compounds which essentially are characterized by the ring system

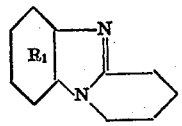

wherein the nucleus $R_1$ is at least partially hydrogenated, which compounds are basic products insoluble in water, soluble in organic solvents, forming with acids salts which, in general, are soluble in water, and are obtainable by condensation of a 6-membered nucleus containing only one nitrogen atom as a hetero-member and an amino group in ortho-position to the said nitrogen atom, with a 6-membered at least partially hydrogenated carbocyclic nucleus containing two reactive and replaceable substituents in ortho-position.

7. The compounds which essentially are characterized by the ring system

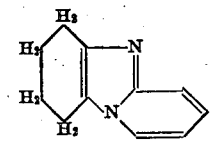

which compounds are basic products insoluble in water, soluble in organic solvents, forming with acids salts which, in general, are soluble in water, which compounds are obtainable by condensation of a 2-aminopyridine with a cyclohexane derivative containing two reactive and replaceable substituents selected from the group consisting of halogen, hydroxyl, alkoxy and keto groups in ortho-position.

8. The compound of the formula:

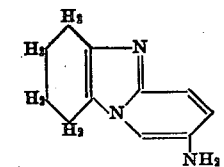

which compound forms white crystals melting at 195° C., is soluble in organic solvents, insoluble in water, and forms with acids salts which are soluble in water, and is obtainable by reduction of the condensation product of 2-amino-5-nitropyridine with an ortho-halogenated cyclohexanone.

9. The compounds which essentially are characterized by a five-membered ring of the formula:

wherein the carbon atoms in the 2- and 3-position are simultaneously members of an at least partially hydrogenated carbocyclic nucleus containing 5 to 6 carbon atoms, the 6-membered nucleus may stand in a naphthalene ring system, and the ring members in the 1- and 5-position are simultaneously members of the heterocyclic nucleus of a quinoline ring system, which compounds display a basic character and are insoluble in water, soluble in organic solvents and form with acids salts which, in general, are soluble in water.

10. The compounds which essentially are characterized by a five-membered ring of the formula:

wherein the carbon atoms in the 2- and 3-position are simultaneously members of an at least partially hydrogenated six-membered carbon ring and the ring members in the 1- and 5-position are simultaneously members of the heterocyclic nucleus of a quinoline ring system, which compounds display a basic character and are insoluble in water, soluble in organic solvents, and form with acids salts which, in general, are soluble in water.

11. The compounds which essentially are characterized by the ring system

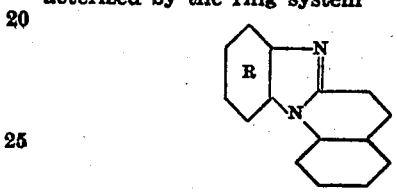

wherein the nucleus R is at least partially hydrogenated, which compounds display a basic character, are insoluble in water, soluble in organic solvents, form with acids salts which, in general, are soluble in water, and are obtainable by condensation of a 2-aminoquinoline with an at least partially hydrogenated 6-membered carbocyclic nucleus containing two reactive and replaceable substituents selected from the group consisting of halogen, hydroxyl, alkoxy and keto groups in ortho-position.

12. The compounds which essentially are characterized by the ring system

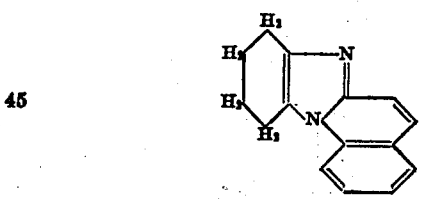

which compounds are basic products insoluble in water, soluble in organic solvents, form with acids salts, which, in general, are soluble in water, and are obtainable by condensation of a 2-aminoquinoline with a cyclohexane containing two reactive and replaceable substituents selected from the group consisting of halogen, hydroxyl, alkoxy and keto groups in ortho-position.

13. The compound of the formula:

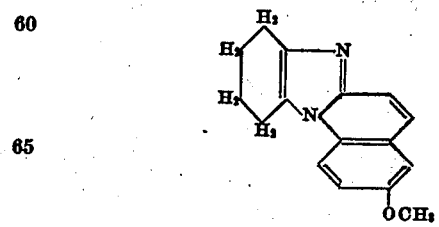

which compound forms white crystals which melt at 153° C. and are readily soluble in acetic acid, forms a hydrochloride which melts at 265° C. and which is difficultly soluble in water, and which compound is obtainable by condensation of an ortho-halogenated cyclohexanone with 2-amino-6-methoxyquinoline.

14. The compounds which essentially are characterized by the ring system

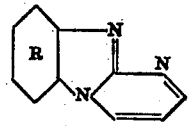

wherein the nucleus R is at least partially hydrogenated, which compounds are basic products insoluble in water, soluble in organic solvents and form with acids salts which, in general, are soluble in water.

15. The compounds which essentially are characterized by the ring system

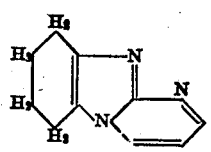

which compounds are basic products insoluble in water, soluble in organic solvents and form with acids salts which, in general, are soluble in water.

16. The compound of the formula:

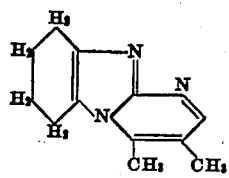

which compound boils under 2 mm. pressure at 190–200° C. as a light yellow oil which yields white crystals which melt at 186° C. and are soluble in organic solvents, insoluble in water.

17. The process which comprises reacting upon a heterocyclic compound containing only nitrogen as the hetero member in a 5- to 6-membered nucleus, which 6-membered nucleus may stand in a quinoline ring system, with an at least partially hydrogenated carbocyclic nucleus containing 5 to 6 carbon atoms and containing two reactive and replaceable substituents in ortho-position, which substituents are selected from the group consisting of halogen, hydroxy, alkoxy and keto groups, and which 6-membered carbocyclic nucleus may stand in a naphthalene ring system.

18. The process which comprises reacting upon a heterocyclic compound containing only nitrogas as the hetero member in a 5- to 6-membered nucleus, which 6-membered nucleus may stand in a quinoline ring system with a cyclohexane, containing two reactive and replaceable substituents in ortho-position, which substituents are selected from the group consisting of halogen, hydroxy, alkoxy and keto groups, while heating.

19. The process which comprises reacting upon an aminopyridine with a cyclohexane containing two reactive and replaceable substituents in the ortho-position, which substituents are selected from the group consisting of halogen, hydroxy, alkoxy and keto groups, while heating.

20. The process which comprises reacting upon an aminopyridine with an ortho-halogen cyclohexanone, while heating.

21. The process which comprises reacting upon an aminopyridine with an ortho-chloro-cyclohexanone, while heating.

22. The process which comprises reacting upon 2-amino-5-nitropyridine with 2-chloro-cyclohexanone, while heating, and reducing the nitro group of the reaction product by a customary reducing agent.

23. The process which comprises reacting upon 1 mol. of 2-amino-5-nitropyridine with about 1 mol. of 2-chloro-cyclohexanone, while heating at about 120° C. for about 10 hours, and reducing the nitro group of the reaction product by a customary reducing agent.

24. The process which comprises reacting upon an aminoquinoline with a cyclohexane containing two reactive and replaceable substituents in the ortho-position, which substituents are selected from the group consisting of halogen, hydroxy, alkoxy and keto groups, while heating.

25. The process which comprises reacting upon an aminoquinoline with an ortho-halogen-cyclohexanone, while heating.

26. The process which comprises reacting upon a 2-aminoquinoline with an ortho-chloro-cyclohexanone, while heating.

27. The process which comprises reacting upon 2-amino-6-methoxyquinoline with ortho-chloro-cyclo-hexanone, while heating.

28. The process which comprises reacting upon about 1 mol. of 2-amino-6-methoxyquinoline with about 1 mol. of ortho-chloro-cyclohexanone in alcoholic solution while heating for about 12 hours.

29. The process which comprises reacting upon 2-aminopyridine with an ortho-halogen-cyclohexanone, while heating.

30. The process which comprises reacting upon a 2-aminopyridine with an ortho-chloro-cyclohexanone, while heating.

31. The process which comprises reacting upon 3 parts by weight of 2-amino-5.6-dimethylpyrimidine with about 5 parts by weight of ortho-chloro-cyclohexanone in alcoholic solution while boiling for about 12 hours.

JOACHIM REITMANN.

Certificate of Correction

October 20, 1936.

Patent No. 2,057,978.

JOACHIM REITMANN

It is hereby certified that errors appear in the printed specification of the above numbered patent requiring correction as follows: Page 1, second column, lines 27 to 33, inclusive, strike out the formula and insert instead the following:

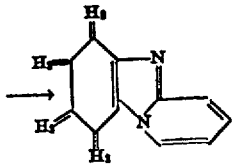

lines 40 to 45, inclusive, strike out the last part of the formula and insert instead

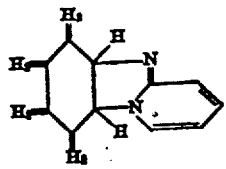

and that the said Letters Patent should be read with these corrections therein that the same may conform to the record of the case in the Patent Office.

Signed and sealed this 9th day of February, A. D. 1937.

[SEAL]

HENRY VAN ARSDALE,
*Acting Commissioner of Patents.*